DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1235

T912,016

ADHESIVE POLYMERIC COMPOSITIONS

Lloyd P. Foster, Albert D. Beeler, and David L. Valentine, all of P.O. Box 511, Kingsport, Tenn. 37662

Continuation of application Ser. No. 135,431, Apr. 19, 1971, which is a division of application Ser. No. 732,891, May 29, 1968, both now abandoned. This application Sept. 25, 1972, Ser. No. 292,687

Int. Cl. C08g *39/06*

U.S. Cl. 252—186

No Drawing. 12 Pages Specification

An additive system for polyvinyl chloride compositions which includes (1) a hydroperoxide component such as tertiary butyl hydroperoxide, cumene hydroperoxide, 2,5-dimethyl,-2,5-bis(hydroperoxy) hexane, and para-methane hydroperoxide, (2) a polyester derived at least in part from 2,2,4-trimethylpentane-1,3-diol and maleic acid or maleic anhydride, (3) a complexing agent for inducing decomposition of the hydroperoxide component to give free radicals such as variable valence metal ions, autooxidative organic compounds, sulfur containing compounds having a tetra-valent sulfur atom directly attached to at least one oxygen atom, acids having an ionization constant of at least $10^{-3}$, and crystalline substances which absorb the hydroperoxide component with an energy (measured at 23° C.) greater than about three kilocalories/mole of hydroperoxide, and which desorbs the resultant free radicals of the decomposed hydroperoxide component.